F. G. JOHNSON.
PIG FARROWING HOUSE.
APPLICATION FILED MAR. 1, 1918.
1,309,071.
Patented July 8, 1919.
2 SHEETS—SHEET 2.
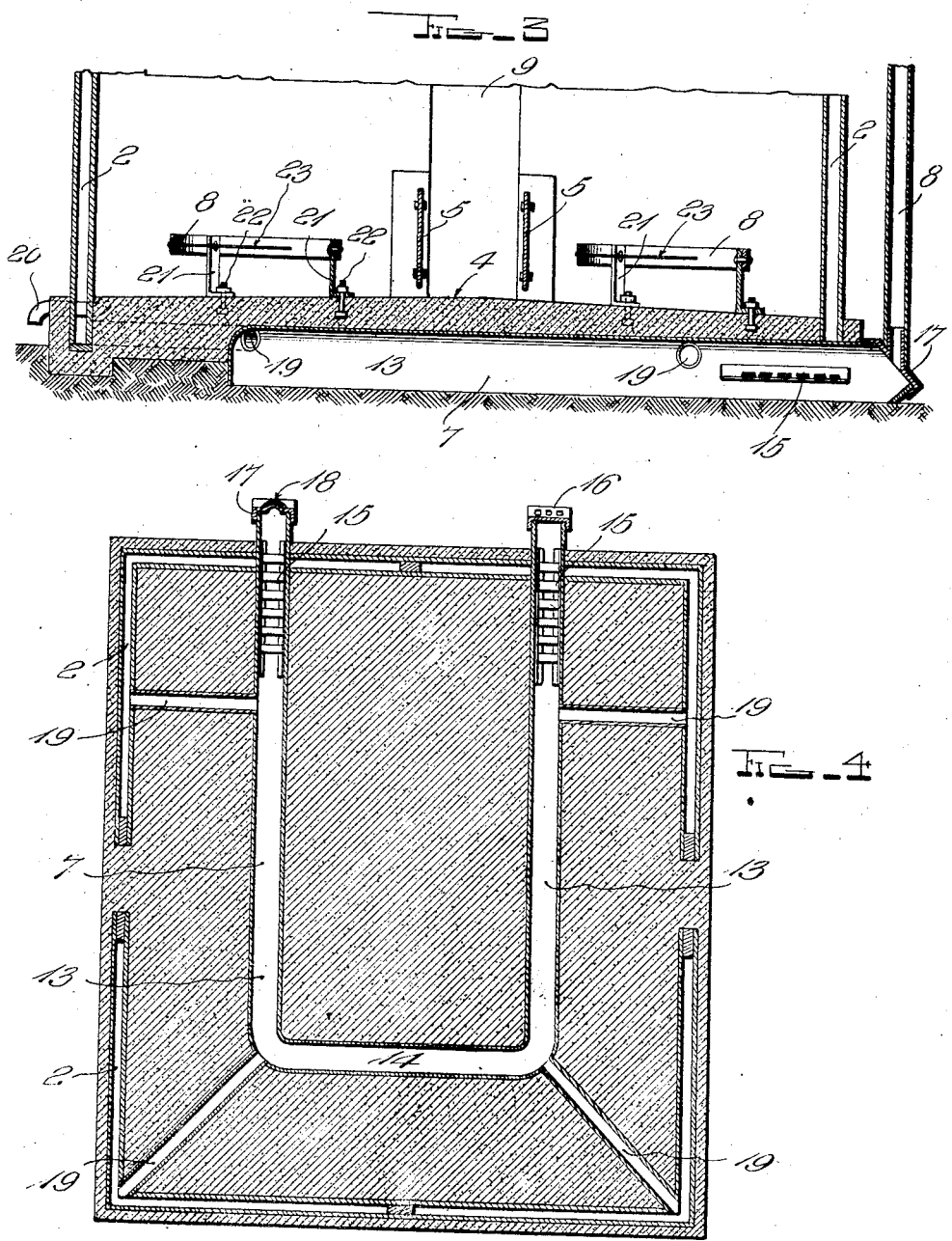
Witness
Inventor
F. G. Johnson
By H. B. Willson & Co.
Attorneys

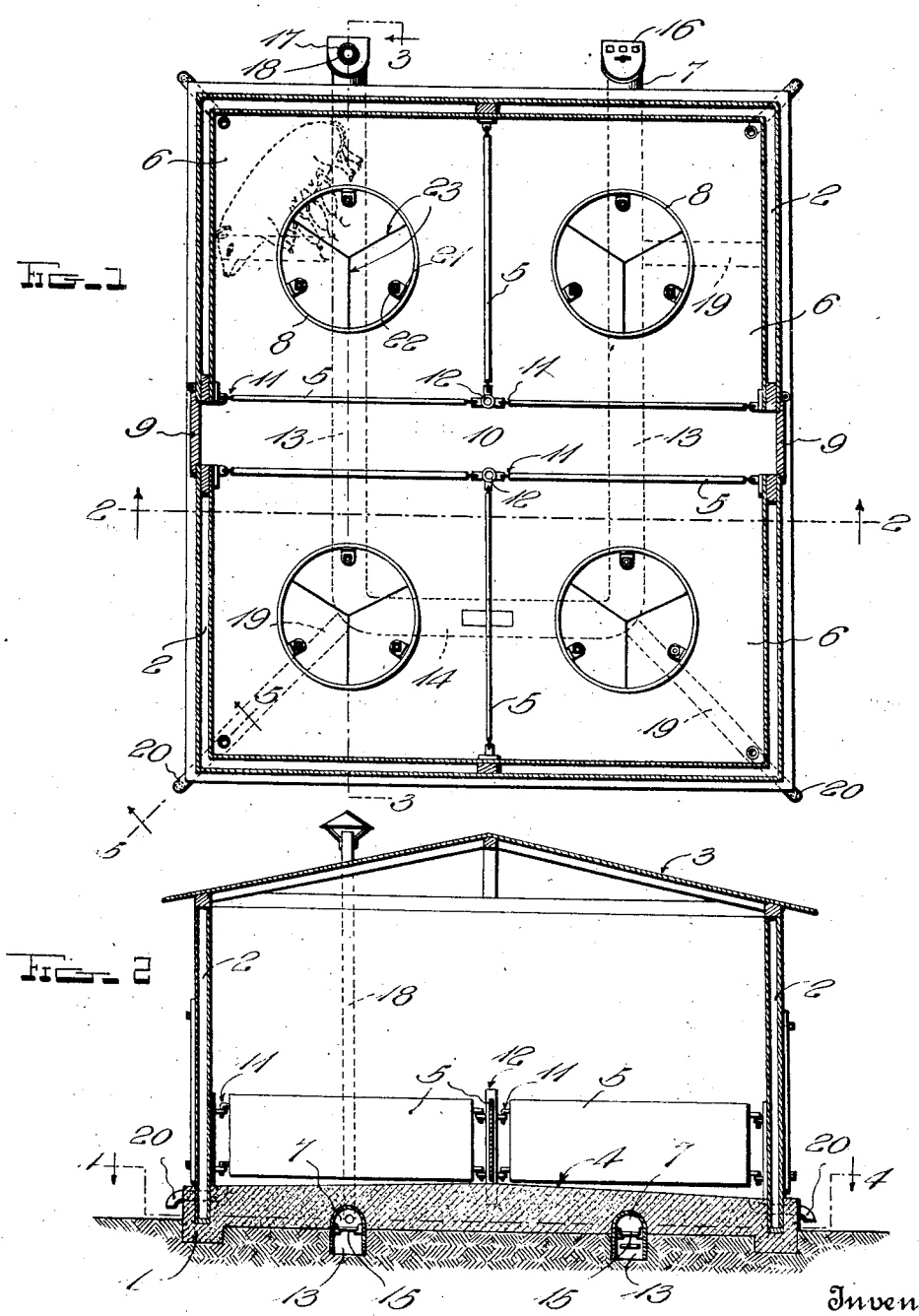

UNITED STATES PATENT OFFICE.

FELIX G. JOHNSON, OF CLARINDA, IOWA.

PIG-FARROWING HOUSE.

1,309,071.

Specification of Letters Patent.

Patented July 8, 1919.

Application filed March 1, 1913. Serial No. 219,932.

*To all whom it may concern:*

Be it known that I, FELIX G. JOHNSON, a citizen of the United States, residing at Clarinda, in the county of Page and State of Iowa, have invented certain new and useful Improvements in Pig-Farrowing Houses; and I do declare the following to be a full, clear, and exact description of the invention, such as will enable others skilled in the art to which it appertains to make and use the same.

My invention has for its object to provide a pig farrowing house so constructed as to permit heating thereof in cold weather, to prevent the sow from so lying down as to prevent the small pigs from nursing, and to reserve the warmest portion of the pen for the brood.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a horizontal section of the farrowing house constituting the subject matter of the present invention;

Fig. 2 is a vertical section on the plane of the line 2—2 of Fig. 1;

Fig. 3 is a view at right angles to Fig. 2 on the plane of the line 3—3 of Fig. 1;

Fig. 4 is a horizontal section through the heating means of the house on the plane designated by the line 4—4 of Fig. 2; and Fig. 5 is a detail transverse section showing more particularly one of the drain pipes, this view being cut on the plane of the line 5—5 of Fig. 1.

In the drawings above briefly described, my invention is shown as consisting briefly of a foundation 1, hollow walls 2 rising therefrom, a roof 3, a suitable floor 4, partitions 5 dividing the interior of the house into a plurality of farrowing pens 6, a heating passage 7 in the floor 4, and a plurality of hoops 8 positioned at the centers of the pens 6 to reserve this portion for the small pigs.

The foundation 1 may be constructed of any preferred material as may also the floor 4, but for illustrative purposes they are shown of an integral cement formation. The hollow walls 2 are by preference constructed of tile, but here again any preferred formation may be employed. In most cases two of the opposite walls will be provided with doors 9 at the ends of a passageway 10 formed between certain of the partitions 5. Obviously the roof 3 may be of any well known construction, but it is preferably joined tightly to the upper edge of the walls 2 in a weather-tight manner.

The partitions 5 are preferably so arranged as to divide the house into four farrowing pens 6, the two pairs of such pens being separated by the passageway 10 as shown clearly in Fig. 1, but it will be obvious that any preferred number of pens may be employed. In all cases, however, the partitions in question are preferably supported by hinges 11 from the walls 2 and posts 12 which rise from the floor 4. By this arrangement, the partitions may be swung against the sides of the house or totally removed whenever it is necessary to provide additional room for any purpose.

The heating passage 7 is preferably in the form of an arch having two parallel stretches 13 extending within or beneath the floor 4 and connected at one end by a transverse stretch 14 also located in or below the floor, the outer ends of the stretches 13 being disposed at the same side of the building. Grates 15 are located in the outer portions of the stretches 13 and caps 16 and 17 are provided for closing the outer ends of these portions, the cap 16 being removable for giving the fire upon the grate 15 the proper attention, while the cap 17 is provided with a smoke pipe 18. The caps 16 and 17 are interchangeable so that a fire may be built on either grate 15 for directing the heat in either direction through the passage 7. From this passage one or more branch passages 19 lead to the spaces within the hollow walls 2 so as to supply such spaces with hot air to maintain them at such a temperature as to insure comfort to the animals within the building, it being of course understood that the floor will be heated to a comfortable temperature from the passage 7. By heating the floor in this manner it is kept in a dry condition, particularly when it inclines downwardly toward its corners and is provided with drain pipes such as 20 at such corners. It is to be observed that a portion of the passage 7 passes along the floor of each of the farrowing pens 6, preferably along the central portions thereof, and it is also to be noted that the hoops 8 are located directly above these portions of the passage, so that the warmest central part of each pen will be reserved for the small pigs. These hoops are spaced upwardly from the floor by vertical legs 21 which are by preference removably bolted to the floor at 22 so that they may be detached when it is required to use the house for other purposes. It is also to be observed that the hoops in question are of such size as to allow only the necessary space in the pen for the sow, this space being sufficiently restricted however to prevent her from lying down in any position except one which will permit the small pigs to nurse as will be clear from the dotted lines of Fig. 1. To prevent the sow from stepping into the hoop, a plurality of wires 23 may be stretched across the same.

From the foregoing, taken in connection with the accompanying drawings, it will be obvious that I have provided a comparatively simple and inexpensive pig farrowing house, yet one which will be highly desirable on account of the heating means, the hingedly mounted partitions, the inclined floor for drainage purposes, and the hoops for the purposes set forth. Since probably the best results are obtained from the several details shown and described, such details are by preference employed, but within the scope of the invention as claimed, numerous minor changes may well be made.

I claim:

1. A pig farrowing pen having heating means for a portion of its floor, a hoop above said portion of the floor for reserving the same for the litter, and legs depending from said hoop and secured to the floor, the space between said hoop and the sides of the pen being restricted in width to permit the sow to lie down only in a position in which the litter may nurse.

2. The combination with a pig farrowing pen, of a hoop above the floor of said pen to reserve a portion thereof for the litter, and legs depending from said hoop and secured to the floor, the portion of the floor between said hoop and the sides of the pen being restricted in width to permit the sow to lie down only in a position in which the litter may nurse.

3. The combination with a pig farrowing pen, of a hoop above the floor of said pen to reserve a portion thereof for the litter, legs depending from said hoop and secured to the floor, and a guard extending across said hoop to prevent the sow from stepping into the same, the portion of the floor between said hoop and the sides of the pen being restricted in width to permit the sow to lie down only in a position in which the litter may nurse.

In testimony whereof I have hereunto set my hand in the presence of two subscribing witnesses.

FELIX G. JOHNSON.

Witnesses:
A. F. HENDERSON,
C. S. McKEE.